United States Patent
Liang et al.

(10) Patent No.: US 9,559,738 B1
(45) Date of Patent: Jan. 31, 2017

(54) TABLET DEVICE WITH PIVOT UNIT HAVING TWIST SPRING

(71) Applicant: Wistron Corp., New Taipei (TW)

(72) Inventors: Chen-Yi Liang, New Taipei (TW); Jen Hao Liu, New Taipei (TW); Ming-Ju Hsieh, New Taipei (TW); Cheng Hsing Liu, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 15/074,048

(22) Filed: Mar. 18, 2016

(30) Foreign Application Priority Data

Oct. 2, 2015 (TW) .............................. 104132494 A

(51) Int. Cl.
*H04M 1/00* (2006.01)
*H04B 1/3877* (2015.01)
*H04M 1/02* (2006.01)

(52) U.S. Cl.
CPC ......... *H04B 1/3877* (2013.01); *H04M 1/0214* (2013.01)

(58) Field of Classification Search
CPC ........................... H04B 1/3877; H04M 1/0214
USPC ................................ 455/575.1, 575.3, 575.4
See application file for complete search history.

(56) References Cited

U.S. PATENT DOCUMENTS

| 8,382,059 | B2* | 2/2013 | Le Gette | F16M 11/04 248/163.1 |
| 8,503,174 | B2* | 8/2013 | Fyke | H04M 1/0237 292/251.5 |
| 8,599,542 | B1* | 12/2013 | Healey | G06F 1/1626 345/168 |
| 9,185,954 | B2* | 11/2015 | Cheung | F16M 11/10 |
| 9,194,536 | B2* | 11/2015 | Kim | F16M 13/00 |
| 2004/0259593 | A1* | 12/2004 | Wang | G06F 1/1616 455/556.1 |
| 2007/0072656 | A1* | 3/2007 | Lo | G06F 1/1616 455/575.3 |
| 2009/0083943 | A1* | 4/2009 | Chen | G06F 1/1681 16/342 |
| 2009/0111540 | A1* | 4/2009 | Inoue | H04M 1/0216 455/575.3 |
| 2011/0312392 | A1* | 12/2011 | Reeves | H04M 1/0216 455/575.3 |
| 2013/0128442 | A1* | 5/2013 | Tseng | G06F 1/1616 361/679.09 |

(Continued)

FOREIGN PATENT DOCUMENTS

TW M346247 12/2008
TW M446354 U1 2/2013

(Continued)

OTHER PUBLICATIONS

Taiwan Patent Office, Office Action, Patent Application Serial No. 104132494, Apr. 7, 2016, Taiwan.

*Primary Examiner* — Md Talukder

(57) ABSTRACT

A tablet device is provided, which includes a first member, a second member and a pivot unit. The first member pivots on the second member via the pivot unit. The pivot unit includes a shaft, a twist sheet, a washer and a twist spring. The twist sheet is telescoped on the shaft. The twist spring is telescoped on the shaft and is connected to the twist sheet. The washer is disposed between the twist sheet and the twist spring. The shaft is connected to the second member. The twist sheet is fixed to the first member.

15 Claims, 25 Drawing Sheets

(56) References Cited

U.S. PATENT DOCUMENTS

| | | | | |
|---|---|---|---|---|
| 2014/0165334 A1* | 6/2014 | Liu | ................... | G06F 1/1613 |
| | | | | 16/337 |
| 2014/0252180 A1* | 9/2014 | Mau | ................... | F16M 11/2021 |
| | | | | 248/123.11 |
| 2015/0047446 A1* | 2/2015 | Lai | ................... | E05D 3/12 |
| | | | | 74/96 |
| 2015/0049427 A1* | 2/2015 | Lai | ................... | E05D 7/00 |
| | | | | 361/679.27 |
| 2015/0055290 A1* | 2/2015 | Lai | ................... | G06F 1/1632 |
| | | | | 361/679.44 |
| 2015/0089770 A1* | 4/2015 | Liang | ................... | G06F 1/16 |
| | | | | 16/386 |
| 2015/0296060 A1* | 10/2015 | Gu | ................... | G06F 1/1633 |
| | | | | 455/575.4 |

FOREIGN PATENT DOCUMENTS

| TW | M486238 U | 9/2014 |
|---|---|---|
| TW | M488841 U | 10/2014 |
| TW | M506309 U | 8/2015 |

\* cited by examiner

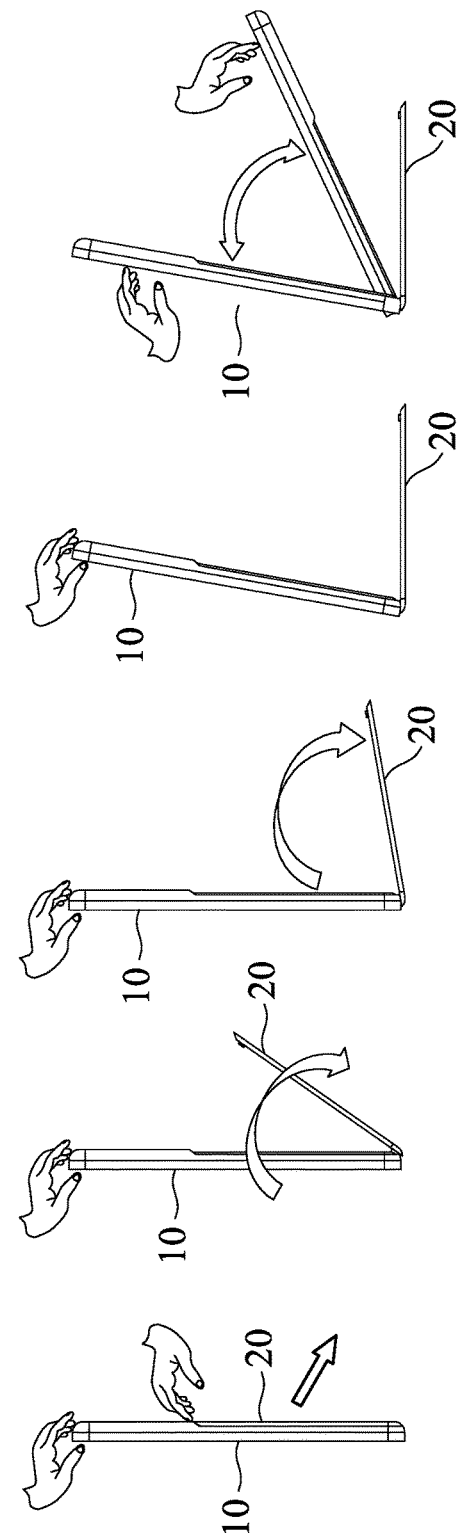

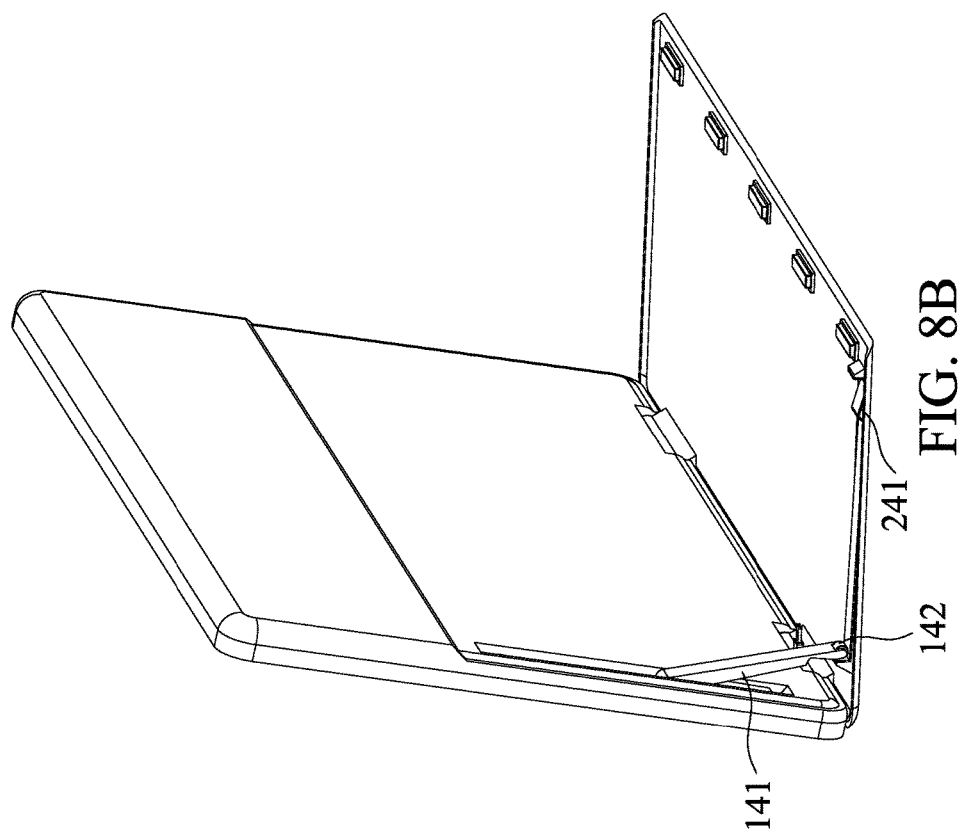

TABLET DEVICE WITH PIVOT UNIT HAVING TWIST SPRING

CROSS REFERENCE TO RELATED APPLICATIONS

This Application claims priority of Taiwan Patent Application No. 104132494, filed on Oct. 2, 2015, the entirety of which is incorporated by reference herein.

BACKGROUND OF THE INVENTION

Field of the Invention

The present invention relates to a tablet device, and in particular to a tablet device with supporting stand.

Description of the Related Art

In a conventional tablet device with a supporting stand, the included angle between the tablet device and the supporting stand cannot be modified one-handed by a user. When the user desires to support the computer with the supporting stand, the included angle between the tablet device and the supporting stand must be modified by the user using both hands. This method of angle modification is annoying, since the support of the supporting stand slides easily and the tablet device may therefore fall down. The user must erect the tablet device rapidly.

BRIEF SUMMARY OF THE INVENTION

The embodiment of the invention provides a tablet device, including a first member, a second member and a pivot unit. The first member pivots on the second member via the pivot unit. The pivot unit comprises a shaft, a twist sheet, a washer and a twist spring. The twist sheet is telescoped on the shaft. The twist spring is telescoped on the shaft and is connected to the twist sheet. The washer is disposed between the twist sheet and the twist spring. The shaft is connected to the second member. The twist sheet is fixed to the first member.

In one embodiment, the first member is the body of the tablet device, and the second member is a supporting stand.

In one embodiment, when an included angle between the first member and the second member is smaller than the first angle, the twist spring pushes the first member and the second member.

In one embodiment, the tablet device further comprises a first magnet and a second magnet. The first magnet is disposed on the first member. The second magnet is disposed on the second member. When the first member overlaps the second member, the first magnet and the second magnet attract each other.

In one embodiment, the first member comprises an elastic pusher. The second member comprises a groove. When the included angle between the first member and the second member is smaller than a second angle, the elastic pusher is located out of the groove. When the included angle between the first member and the second member is between the first angle and the second angle, the elastic pusher is inserted into the groove.

In one embodiment, the pivot unit further comprises a cam washer. The cam washer is telescoped on the shaft. The cam washer comprises an inclined plane. The shaft comprises a protrusion. When the included angle between the first member and the second member form a second angle, the protrusion abuts the inclined plane.

In one embodiment, the first member further comprises a connection portion. The second member comprises a supporting sheet and a sliding slot. An end of the supporting sheet slides in the sliding slot. When the included angle between the first member and the second member is between the first angle and a second angle, the other end of the supporting sheet abuts the connection portion.

In one embodiment, the first member is connected to the supporting sheet via magnetic attraction.

In one embodiment, the first member comprises a groove. The second member comprises a supporting arm. When the included angle between the first member and the second member form a second angle, the supporting arm abuts the groove.

In one embodiment, the supporting arm stands on the second member by magnetic repulsion.

In one embodiment, the first member comprises a supporting arm. The second member comprises a protrusion. When the included angle between the first member and the second member form a second angle, the supporting arm abuts the protrusion.

In one embodiment, the supporting arm comprises a roller. The roller is disposed on an end of the supporting arm. The roller is attached to the second member by magnetic attraction.

In one embodiment, the supporting arm further comprises a spring, and the spring is disposed on the other end of the supporting arm.

In one embodiment, the first member comprises a supporting arm. The supporting arm pivots on the first member. The second member comprises a rail. The supporting arm comprises a pillar. The pillar slides in the rail.

In one embodiment, the rail comprises an inclined plane. When the included angle between the first member and the second member form a second angle, the pillar abuts the inclined plane.

In one embodiment, the second member further comprises a U-shaped frame. When the included angle between the first member and the second member form a second angle, the U-shaped frame supports the first member.

In one embodiment, the first angle is 80 degrees.

In one embodiment, a torque of the twist spring is greater than a sum of a torque of the second member applied to a rotation axis and a torque for opening the pivot unit.

In one embodiment, a sum a torque of the first member applied to the rotation axis and a torque for closing the pivot unit is greater than the torque of the twist spring.

In one embodiment, the sum of the torque of the twist spring and the torque for closing the pivot unit is greater than the torque of the first member applied to the rotation axis.

In one embodiment, the sum of the torque of the twist spring and the torque for closing the pivot unit subtracting the torque of the first member applied to the rotation axis is greater than the torque of the external force applied to the rotation axis.

Utilizing the tablet device of the embodiments of the invention, the user separates the second member from the first member using both hands only when the included angle between the first member and the second member is zero. Then, the included angle between the first member and the second member can be changed single-handedly by the user. During the included angle modification, the supporting stand sufficiently contacts the table, and supports the tablet.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 1A, 1B, 1C, 1D and 1E show the opening process of the tablet device of the first embodiment of the invention;

FIGS. 8A and 8B show the supporting arm of the sixth embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

FIGS. 1A~1E show an opening process of a tablet device 1 of a first embodiment of the invention. The tablet device includes a first member (in this embodiment, the first member is a body of the tablet device) 10, a second member (in this embodiment, the second member is a supporting stand) 20 and a pivot unit (not shown). The first member 10 pivots on the second member 20 via the pivot unit. With reference to FIG. 1A, when an included angle between the first member 10 and the second member 20 is zero, the user separates the second member 20 from the first member 10 with two hands. With reference to FIG. 1B, then, the second member 20 moves away from the first member 10 automatically by the elastic force of the pivot unit. In one embodiment, the torque of the twist spring of the pivot unit is greater than a sum of the torque of the second member applied to a rotation axis and the torque for opening the pivot unit. Therefore, the second member 20 can move away from the first member 10 by the elastic force of the pivot unit.

Next, with reference to FIG. 1C, when the included angle between the first member 10 and the second member 20 form a first angle (in this embodiment, the first angle is 80 degrees), the second member 20 is stopped by a blocking structure.

Therefore, with reference to FIG. 1D, the second member 20 can be laid flat on the table. With reference to FIG. 1E, when the finger of the user pushes the first member 10, the pivot unit supports the first member 10 with elastic force to prevent the first member 10 from falling down. In one embodiment, the sum of the torque of the twist spring and the torque for closing the pivot unit is greater than the torque of the first member applied to the rotation axis. Therefore, the first member can equilibrate in any orientation. In one embodiment, the sum of the torque of the twist spring and the torque for closing the pivot unit subtracting the torque of the first member applied to the rotation axis is greater than the torque of an external force (for example, 300 grams) applied to the rotation axis. Therefore, the first member can be pushed by the external force without changing its orientation.

Figure 2C:
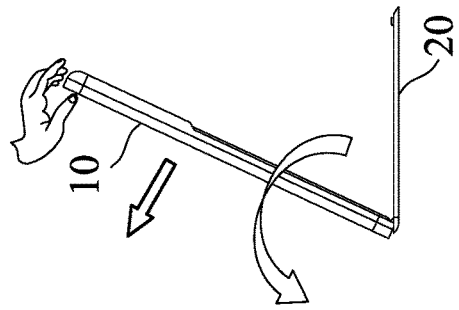
FIGS. 2A, 2B and 2C show another opening process of the tablet device of the first embodiment of the invention.
Figure 2B:
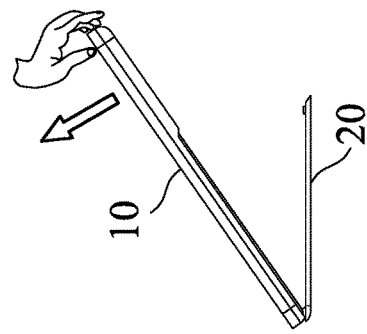
Figure 2A:
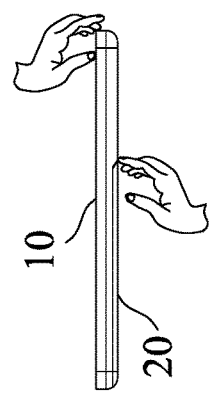

FIGS. 2A~2C show another opening process of a tablet device 1 of a first embodiment of the invention. With reference to FIGS. 2A and 2B, when an included angle between the first member 10 and the second member 20 is zero, the user separates the second member 20 from the first member 10 with two hands. With reference to FIG. 2C, when the included angle between the first member 10 and the second member 20 is greater than a second angle (for example, 30 degrees) but smaller than the first angle, the included angle between the first member 10 and the second member 20 can be modified single-handedly by the user.

In the embodiment above, the angle disclosed is for example, which are not meant to restrict the invention.

Figure 3A:
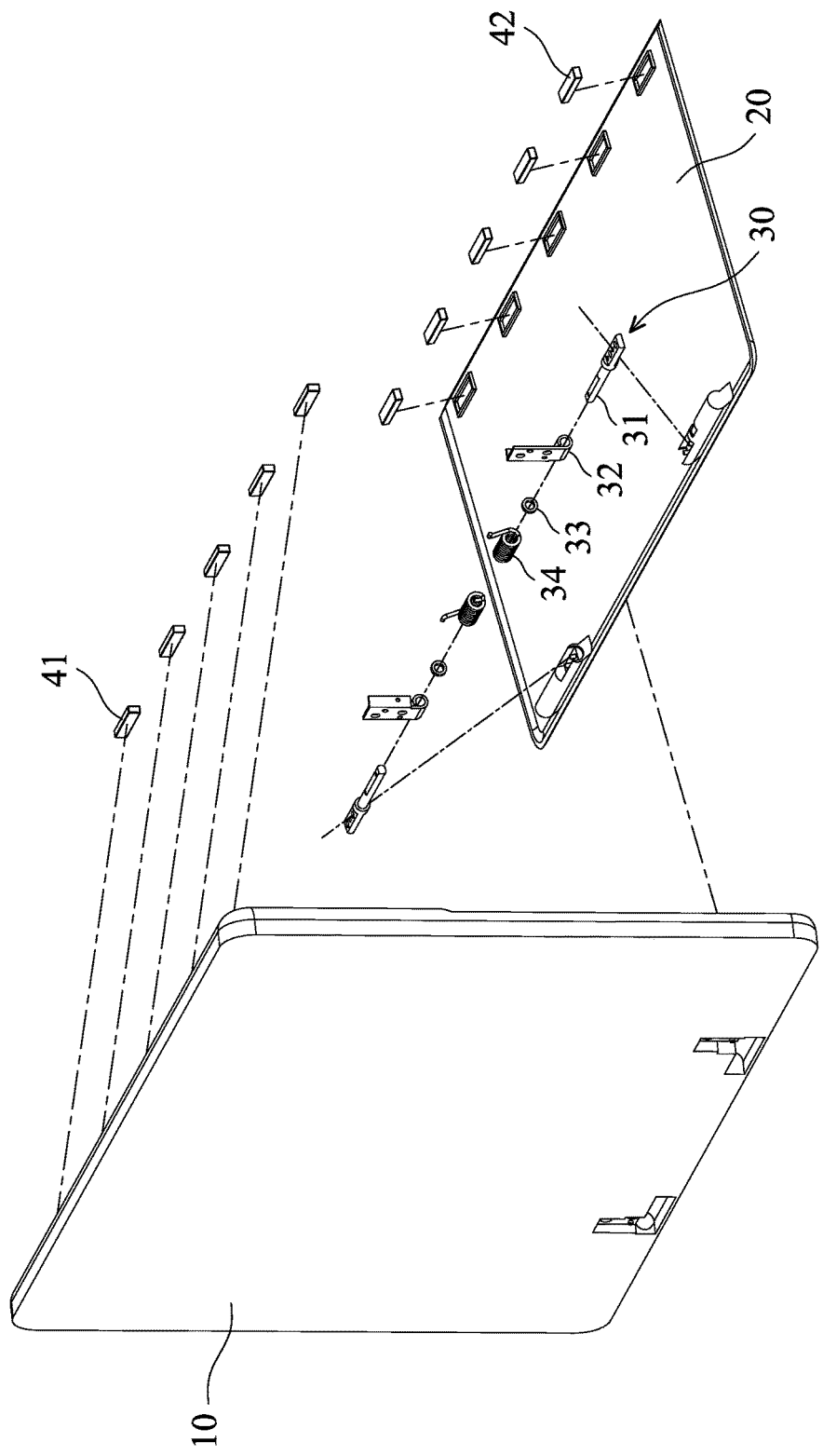
FIG. 3A is an exploded view of the tablet device of the first embodiment of the invention.

FIG. 3A is an exploded view of the tablet device 1 of the first embodiment of the invention. The first member 10 pivots on the second member 20 by the pivot unit 30. The pivot unit 30 comprises a shaft 31, a twist sheet 32, a washer 33 and a twist spring 34. The twist sheet 32 is telescoped on the shaft 31. The twist spring 34 is telescoped on the shaft 31 and is connected to the twist sheet 32. The washer 33 is disposed between the twist sheet 32 and the twist spring 34. The shaft 31 is connected to the second member 20. The twist sheet 32 is fixed to the first member 10.

Figure 3B:
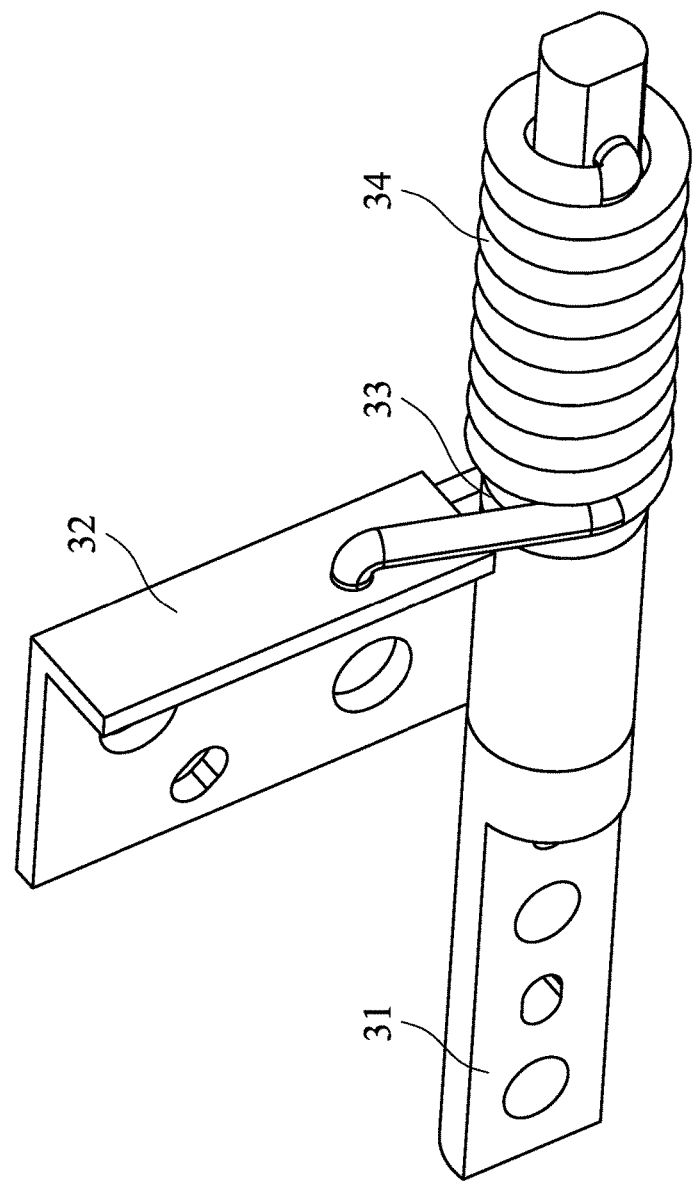
FIG. 3B is an assembled view of the tablet device of the first embodiment of the invention.

FIG. 3B shows an assembly view of the pivot unit 30. When the included angle between the first member 10 and the second member 20 is smaller than the first angle, the twist spring 34 pushes the first member 10 and the second member 20 with the shaft 31 and the twist spring 32. Therefore, the second member 20 moving away from the first member 10 automatically by the elastic force of the pivot unit as shown in FIG. 1B is realized. Additionally, the included angle between the first member 10 and the second member 20 being modified by the user using just one hand as shown in FIG. 2C is realized.

With reference to FIG. 3A, in one embodiment, the tablet device 1 further comprises a first magnet 41 and a second magnet 42. The first magnet 41 is disposed on the first member 10. The second magnet 42 is disposed on the second member 20. When the first member 10 overlaps the second member 20, the first magnet 41 and the second magnet 42 attract each other.

Figure 4A:
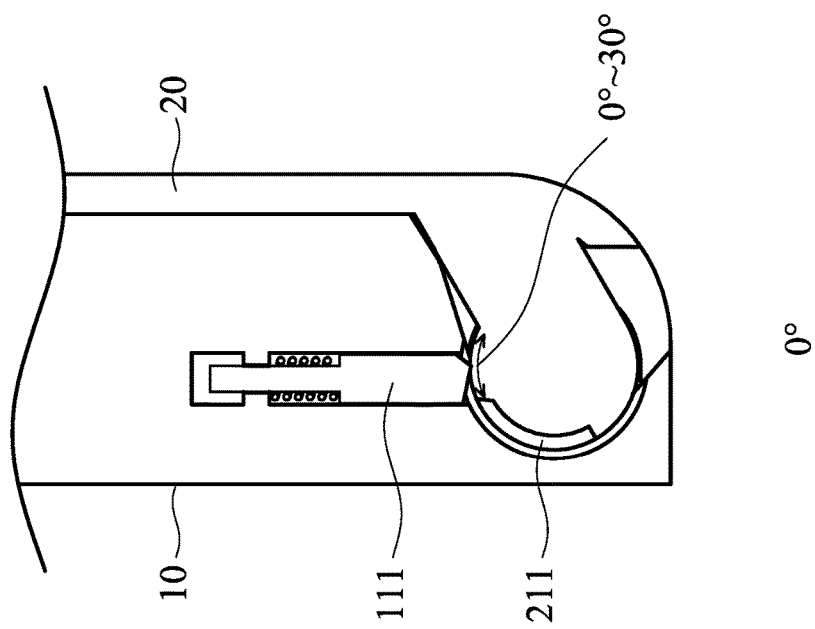
FIGS. 4A, 4B and 4C show the elastic pusher of the second embodiment of the invention.
Figure 4B:
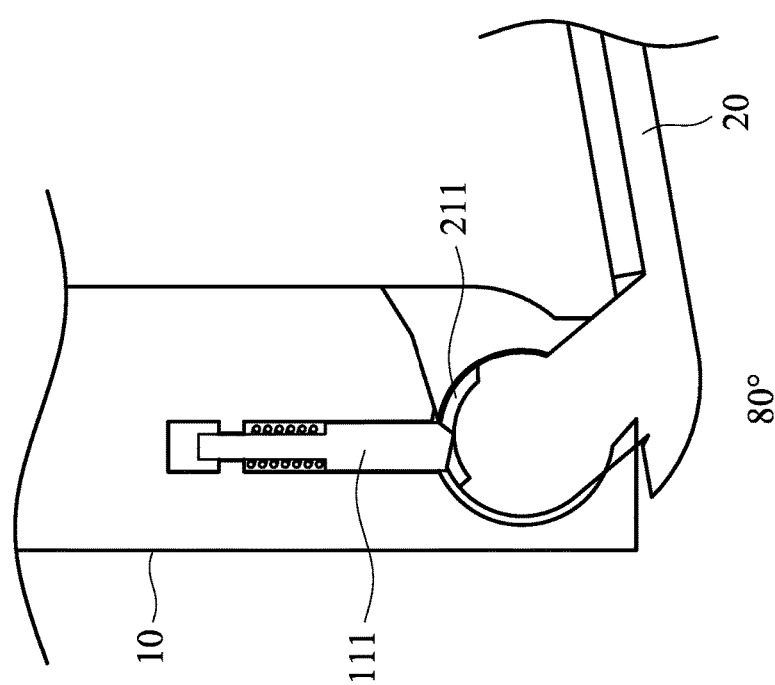
Figure 4C:
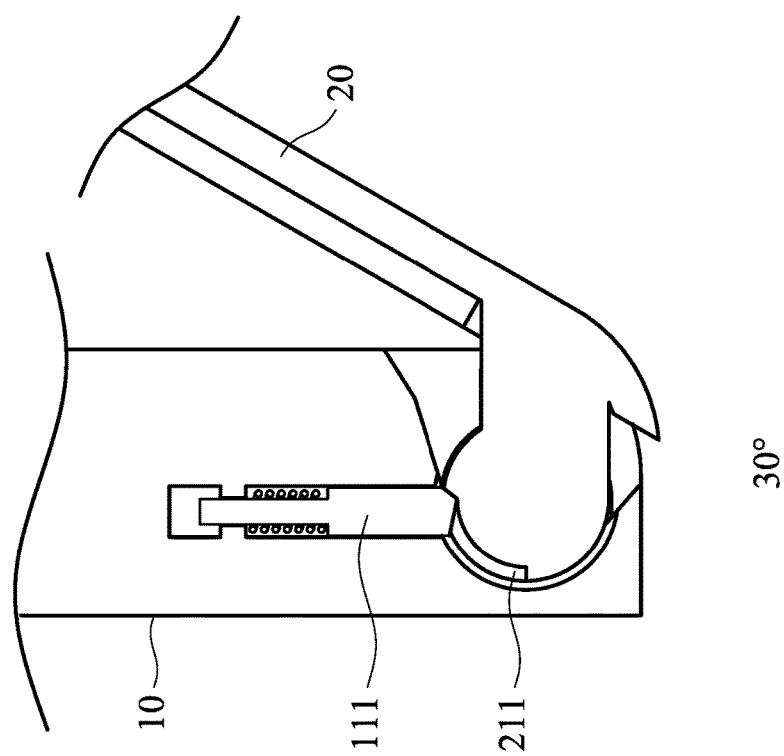

With reference to FIG. 4A~4C, in a second embodiment, the first member 10 comprises an elastic pusher 111. The second member 20 comprises a groove 211. With reference to FIG. 4A, when the included angle between the first member 10 and the second member 20 is smaller than a second angle, the elastic pusher 111 is located out of the groove 211. With reference to FIG. 4B, when the included angle between the first member 10 and the second member 20 is between the first angle and the second angle, the elastic pusher 111 is inserted into the groove 211. With reference to FIG. 4C, when the included angle between the first member 10 and the second member 20 is changed from being bigger than the second angle to being smaller than the second angle, the elastic pusher 111 pushes against an edge of the groove 211 to provide resistance. Therefore, the user must provide more thrust to reduce the included angle between the first member 10 and the second member 20.

Figure 5A:
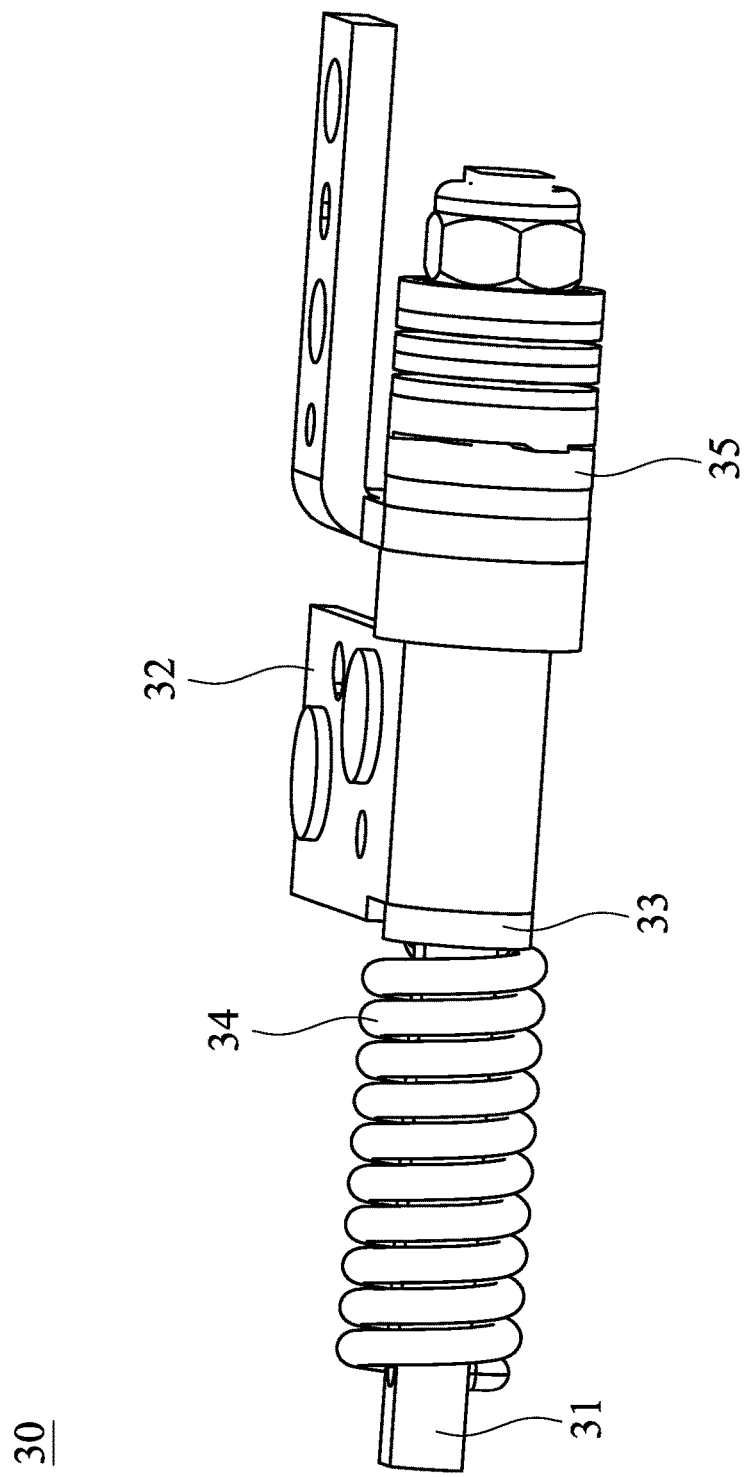
FIGS. 5A, 5B and 5C show the pivot unit of the third embodiment of the invention.
Figure 5B:
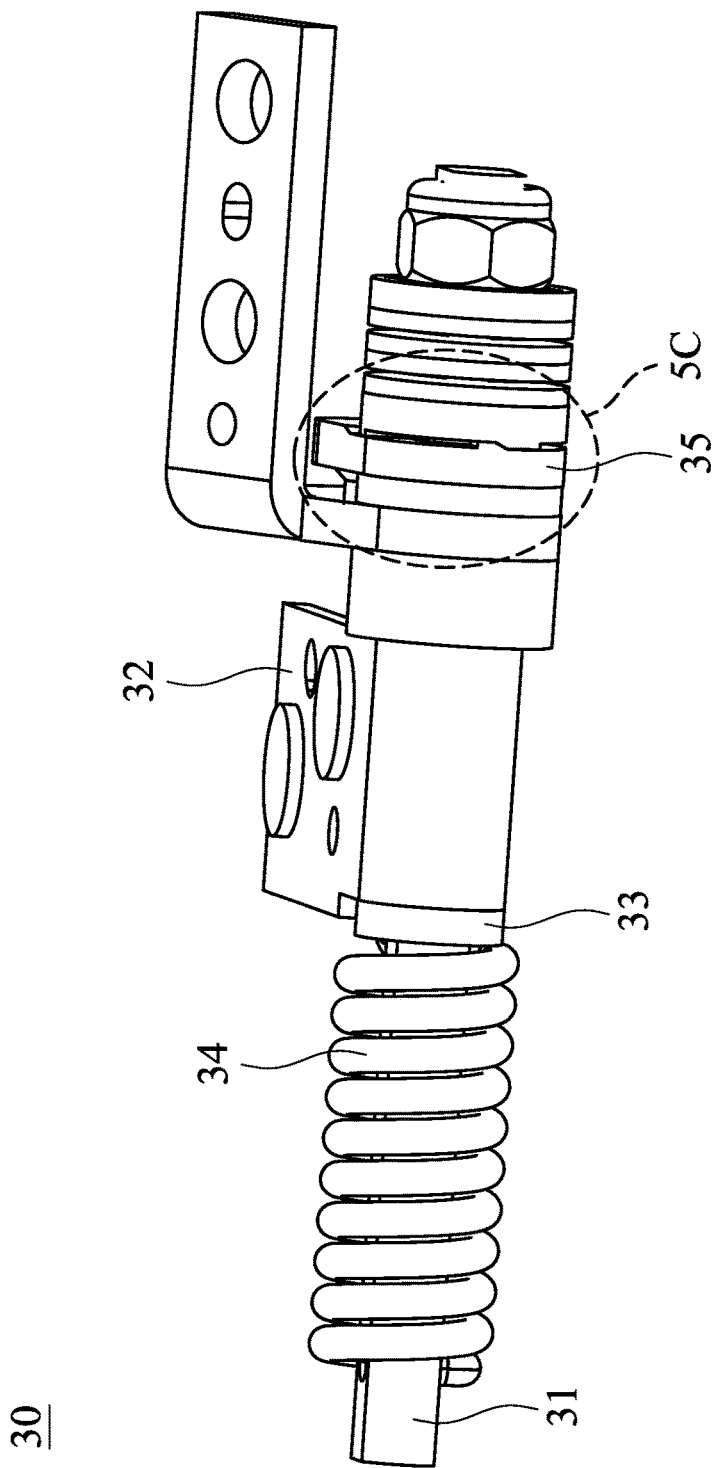
Figure 5C:
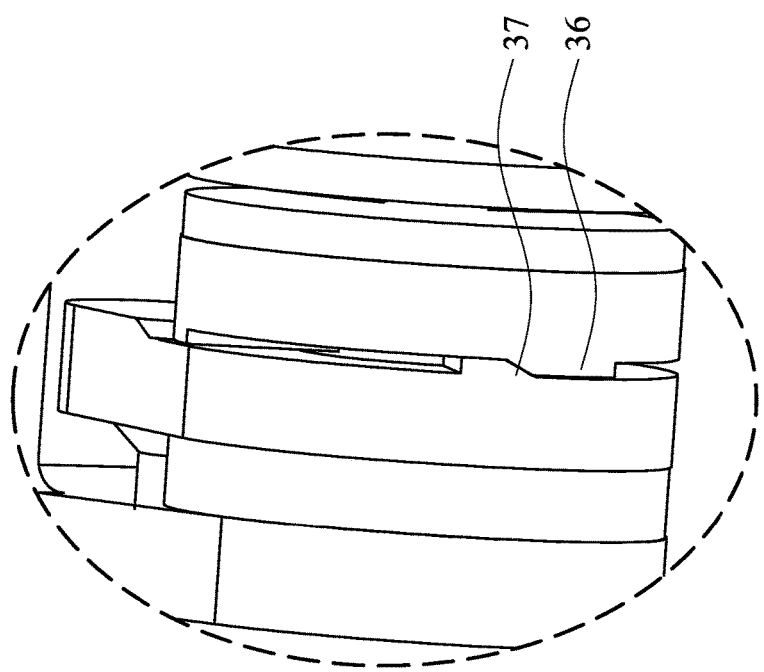

With reference to FIGS. 5A-5C, in a third embodiment, the pivot unit 30 further comprises a cam washer 35. The cam washer 35 is telescoped on the shaft 31. With reference to FIG. 5C, which is an enlarged view of portion 5C of FIG. 5B, the cam washer 35 comprises an inclined plane 37. The shaft comprises a protrusion 36. When the included angle between the first member 10 and the second member 20 form the second angle, the protrusion 36 abuts the inclined plane 37 to increase the resistance for overlapping the first member 10 with the second member 20.

Figure 6A:
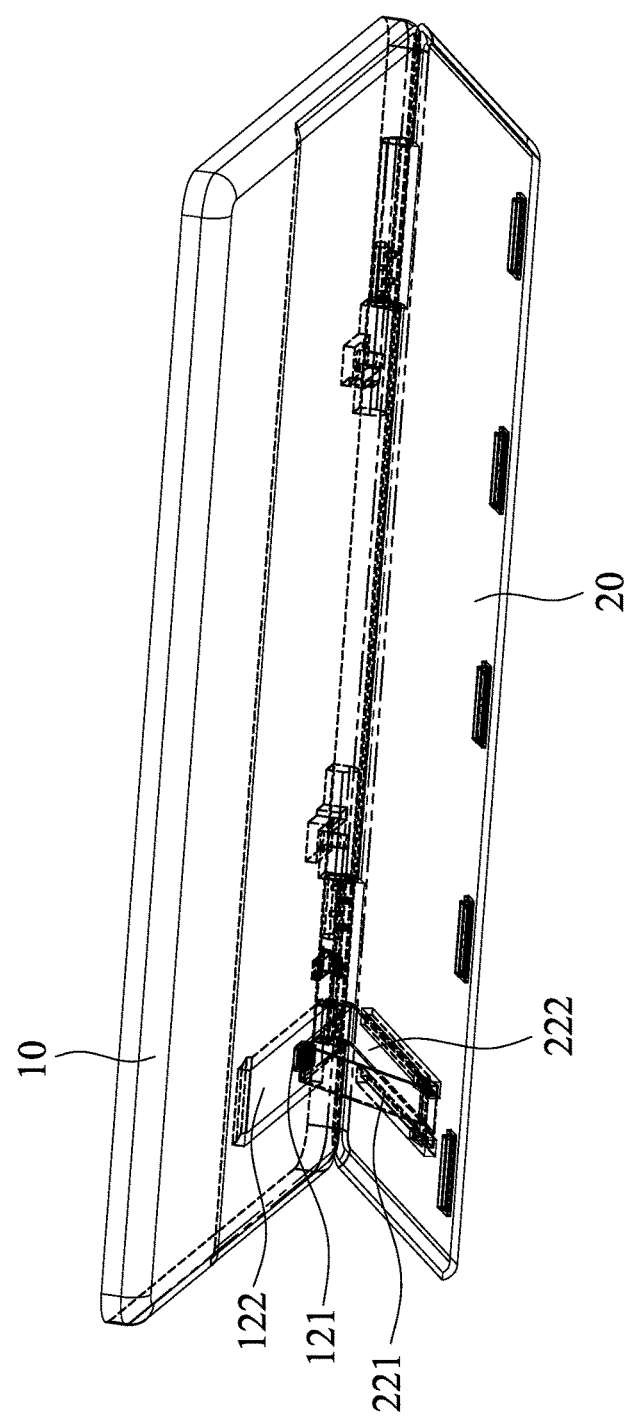
FIGS. 6A and 6B show the supporting sheet of the fourth embodiment of the invention.
Figure 6B:
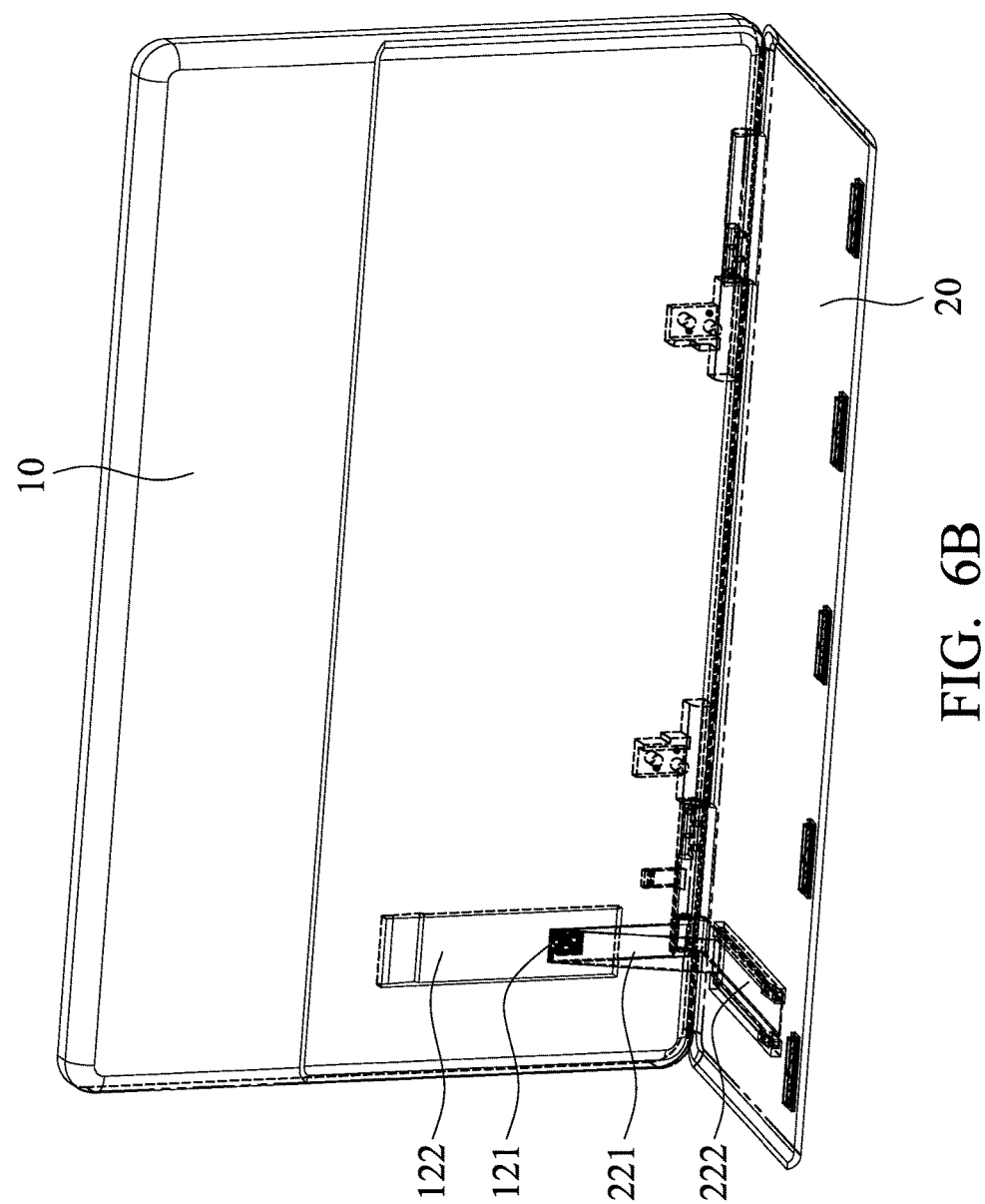

With reference to FIGS. 6A-6B, in a fourth embodiment, the first member 10 further comprises a connection portion 121. The second member 20 comprises a supporting sheet 221 and a sliding slot 222. An end of the supporting sheet 221 slides in the sliding slot 222. When the included angle between the first member 10 and the second member 20 is between the first angle and the second angle, the other end of the supporting sheet 221 abuts the connection portion 121. In one embodiment, the first member 10 is connected to the supporting sheet 221 via magnetic attraction. With reference to FIG. 4A, when the included angle between the first member 10 and the second member 20 form the second angle (FIG. 6A), the supporting sheet 221 abuts the first member 10 and an end of the sliding slot 222 to increase the resistance for overlapping the first member 10 with the second member 20. In this embodiment, a recess 122 is formed on the surface of the first member 10. When the first member 10 overlaps the second member 20, the supporting sheet 221 and the sliding slot 222 are located in the recess 122, and the supporting sheet 221 is separated from the connection portion 121. In one embodiment, the supporting sheet 221 can also keep contacting the connection portion 121.

Figure 7A:
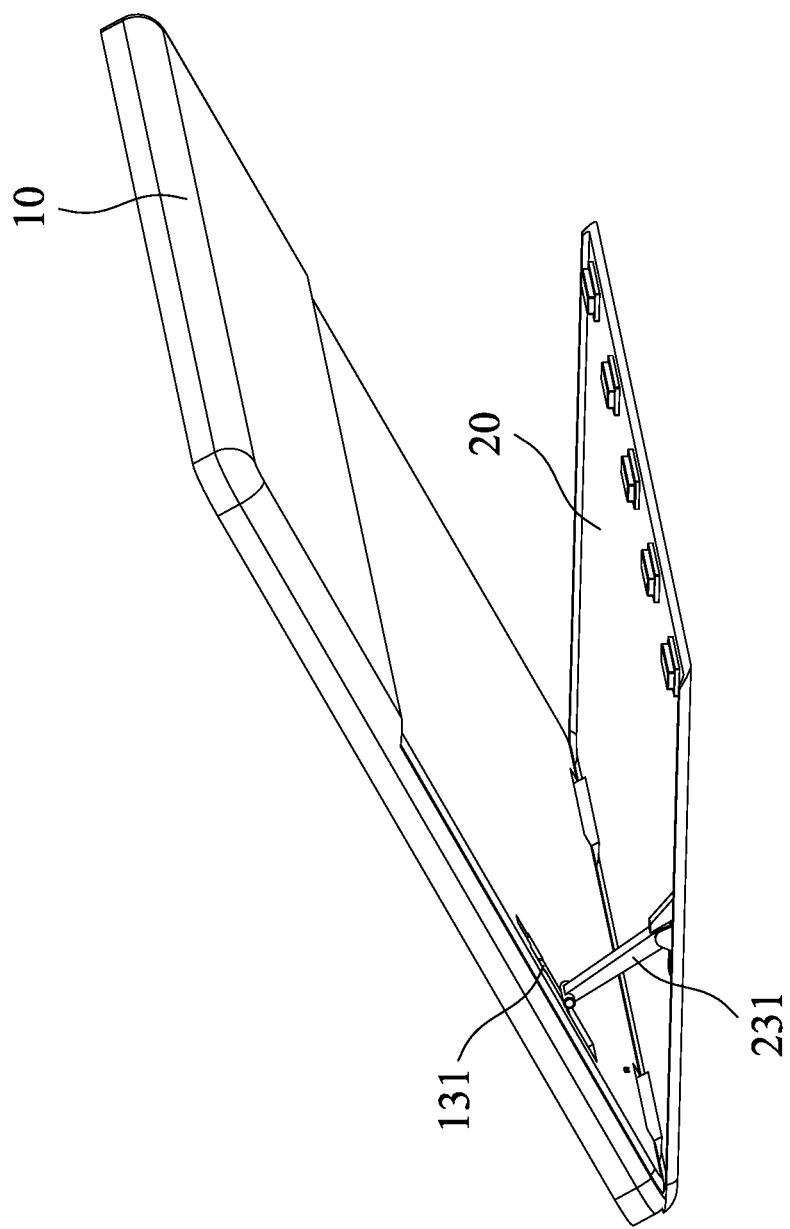
FIGS. 7A and 7B show the supporting arm of the fifth embodiment of the invention.
Figure 7B:
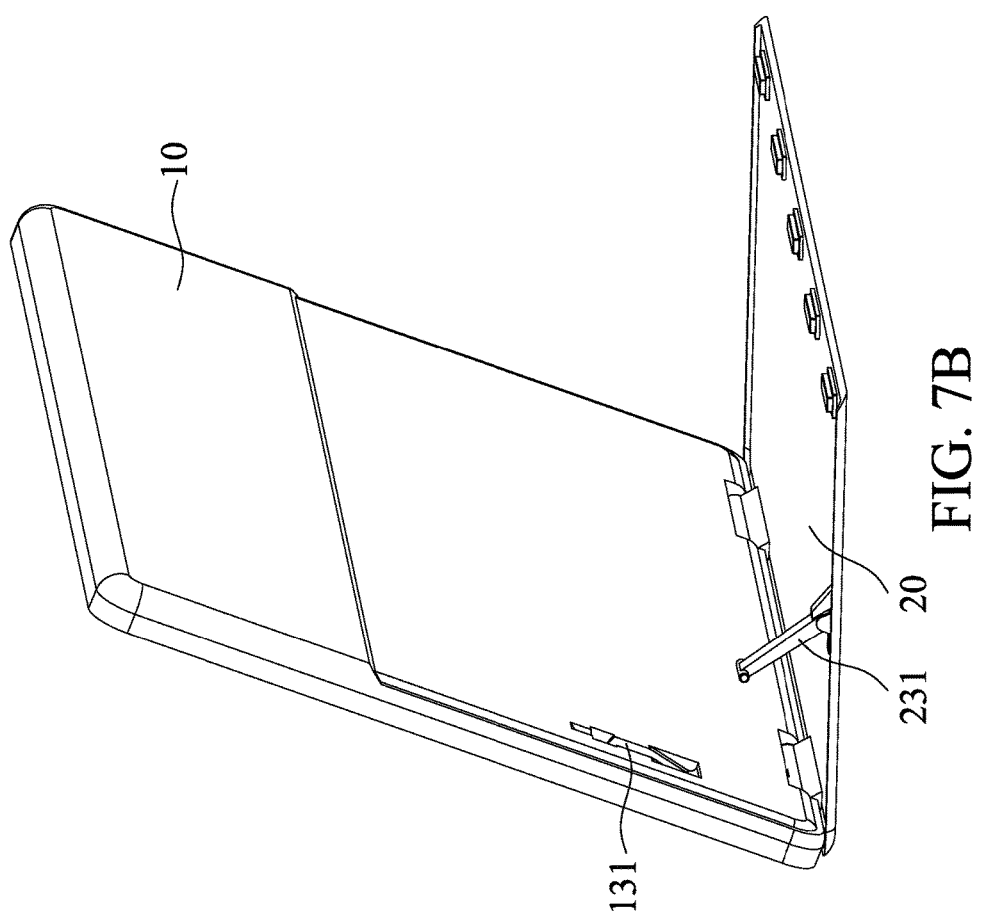

With reference to FIGS. 7A-7B, in a fifth embodiment, the first member 10 comprises a groove 131. The second member 20 comprises a supporting arm 231. When the included angle between the first member 10 and the second member 20 form the second angle (FIG. 7A), the supporting arm 231 abuts the groove 131 to increase the resistance for overlapping the first member 10 with the second member 20. In this embodiment, the supporting arm 231 pivots on the second member 20. The supporting arm 231 stands on the second member 20 by magnetic repulsion. When the first member 10 overlaps the second member 20, the supporting arm 231 is received in the groove 131.

Figure 8A:
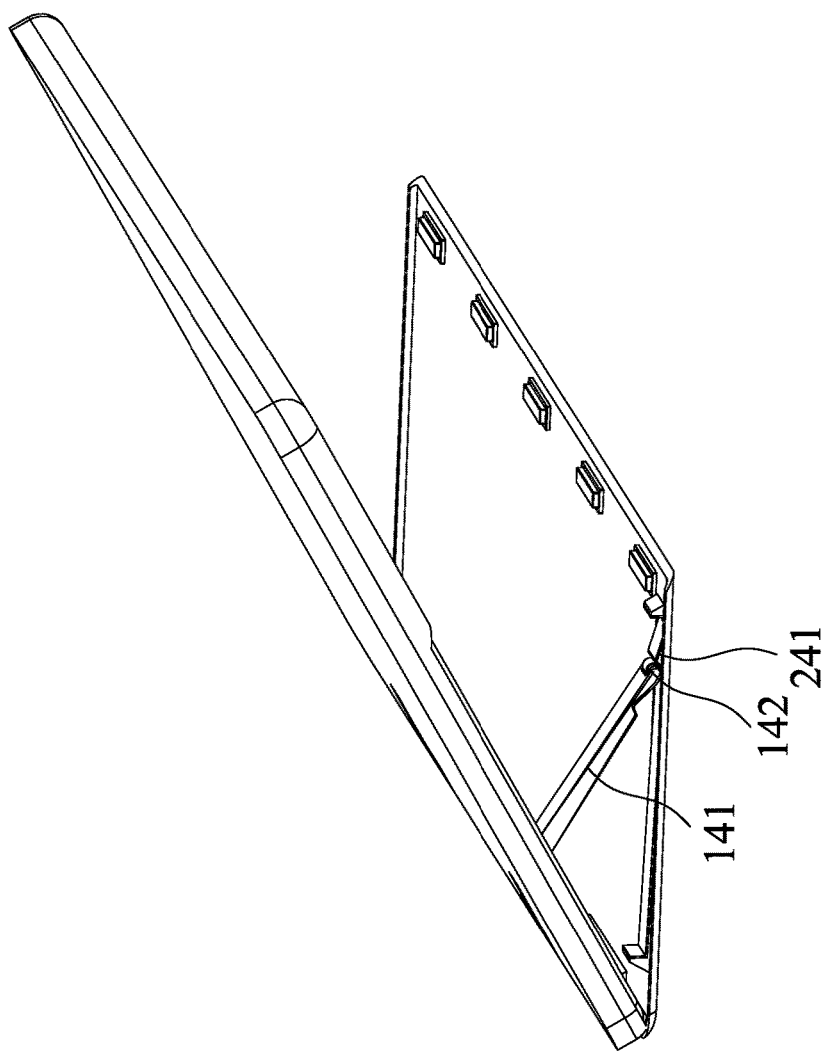

With reference to FIGS. 8A-8B, in a sixth embodiment, the first member 10 comprises a supporting arm 141. The second member 20 comprises a protrusion 241. The supporting arm 141 pivots on the first member 10. When the included angle between the first member 10 and the second member 20 form a second angle (FIG. 8A), the supporting arm 141 abuts the protrusion 241 to increase the resistance for overlapping the first member 10 with the second member 20. In this embodiment, the supporting arm 141 includes a roller 142, and the roller 142 is disposed on an end of the supporting arm 141. The roller 141 is attached to the second member 20 by magnetic attraction.

Figure 9:
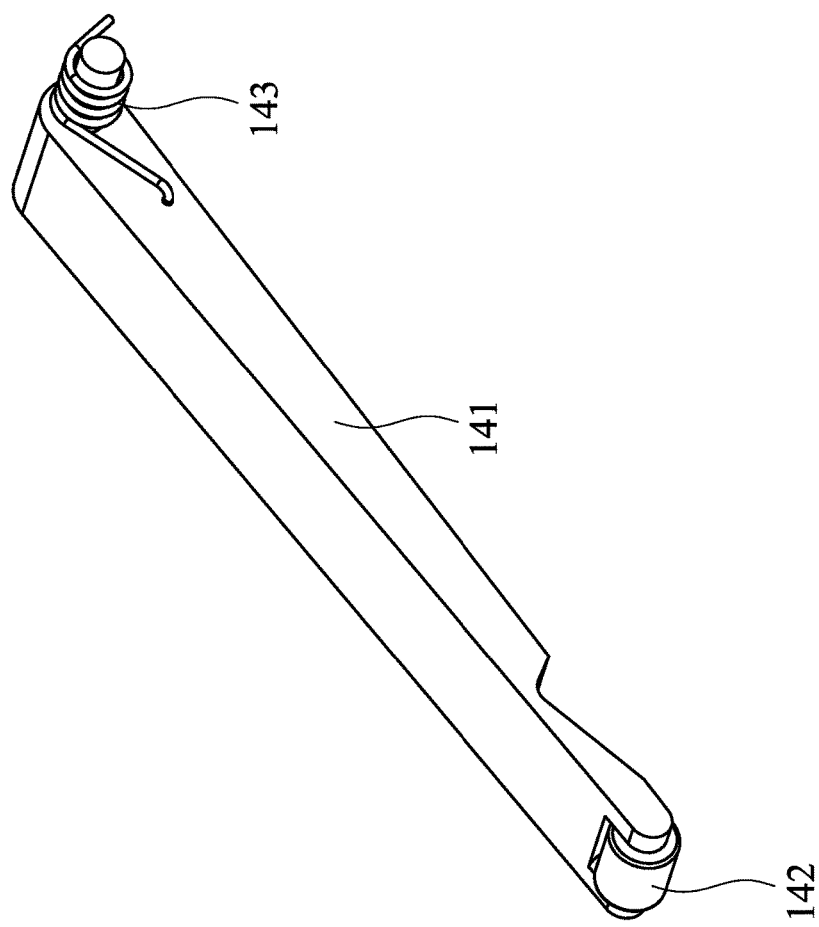
FIG. 9 shows the supporting arm of the seventh embodiment of the invention.

With reference to FIG. 9, in a seventh embodiment, the supporting arm 141 further comprises a spring 143, and the spring 143 is disposed on the other end of the supporting arm 141. The spring 143 can replace the magnetic attraction design of the sixth embodiment.

Figure 10A:
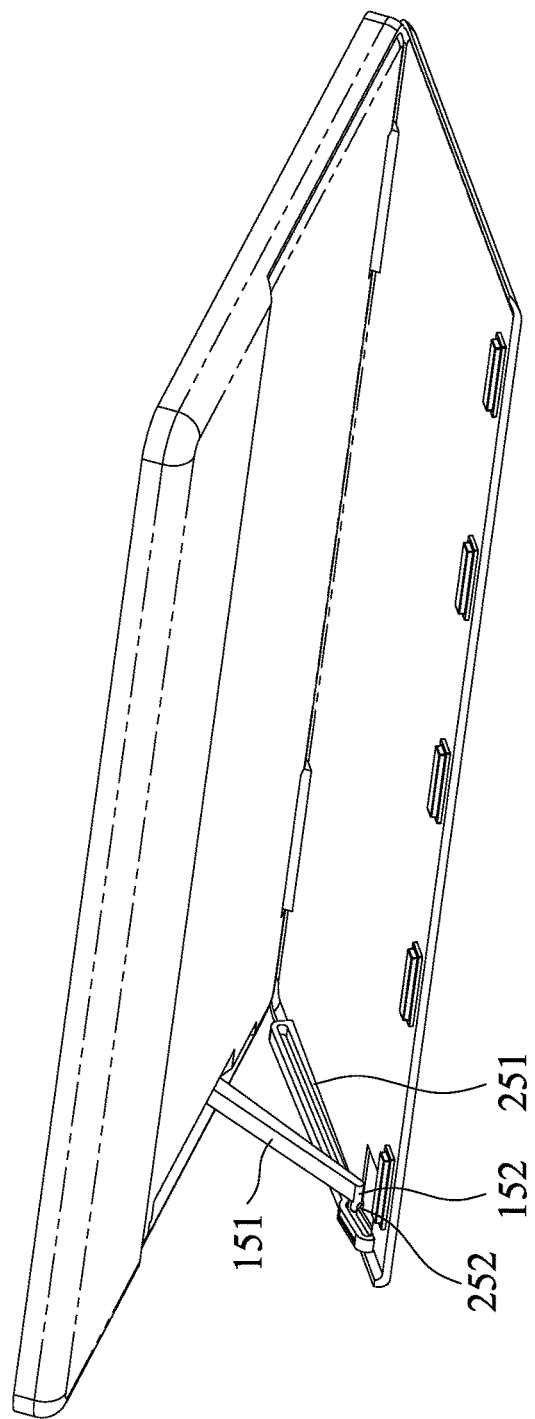
FIGS. 10A and 10B show the supporting arm of the eighth embodiment of the invention.
Figure 10B:
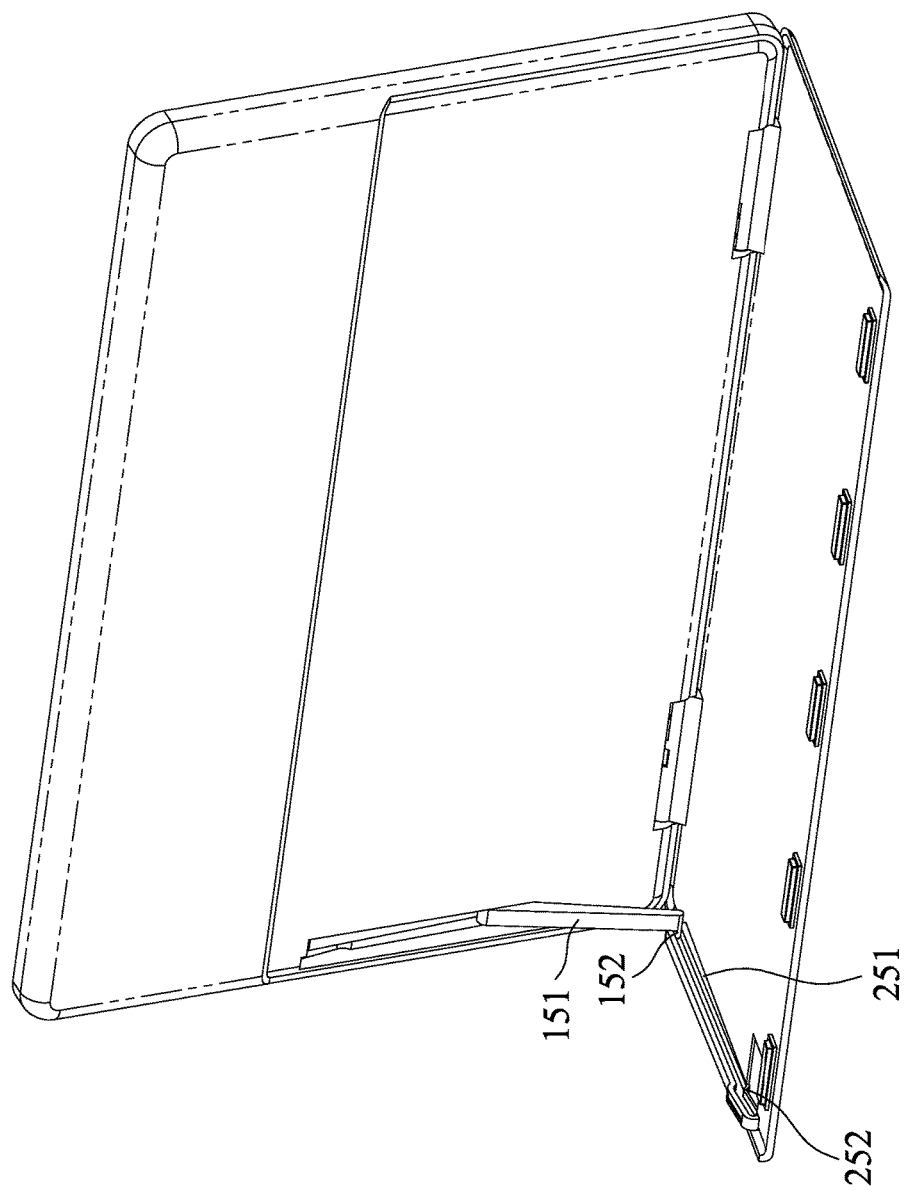

With reference to FIGS. 10A-10B, in an eighth embodiment, the supporting arm 151 pivots on the first member 10. The second member 20 comprises a rail 251. The supporting arm 151 comprises a pillar 152. The pillar 152 slides in the rail 251. The rail 251 comprises an inclined plane 252. When the included angle between the first member 10 and the second member 20 form the second angle (FIG. 10A), the pillar 152 abuts the inclined plane 252 to increase the resistance for overlapping the first member 10 with the second member 20.

Figure 11A:
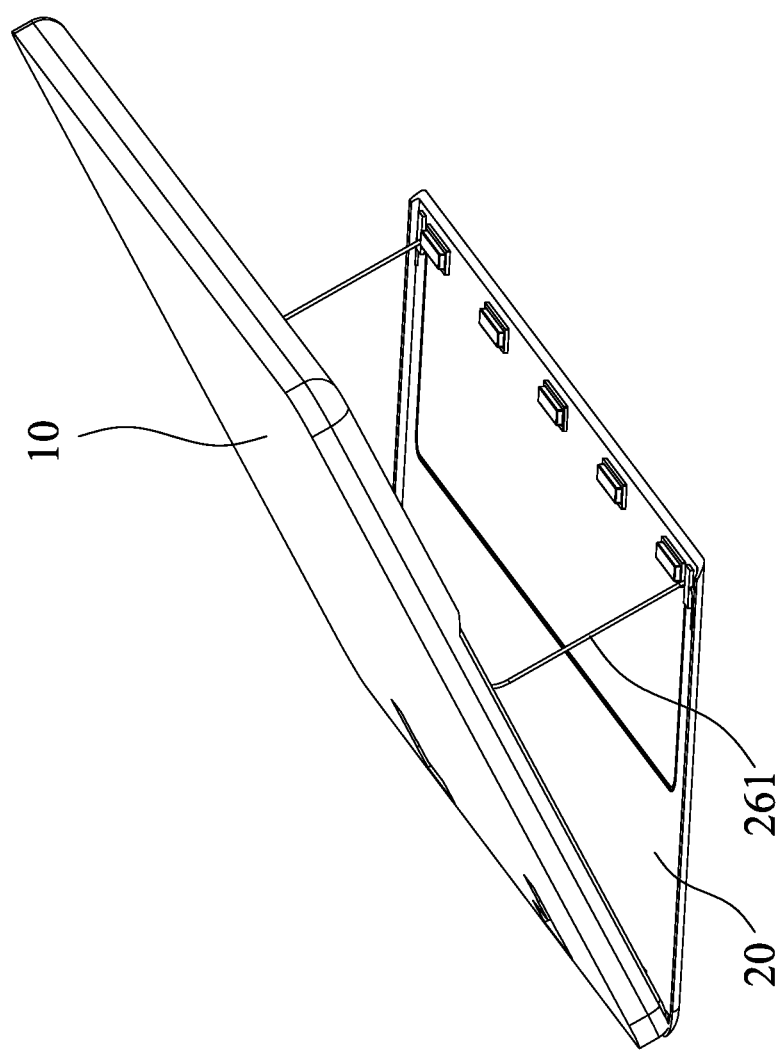
FIGS. 11A and 11B show the U-shaped frame of the ninth embodiment of the invention.
Figure 11B:
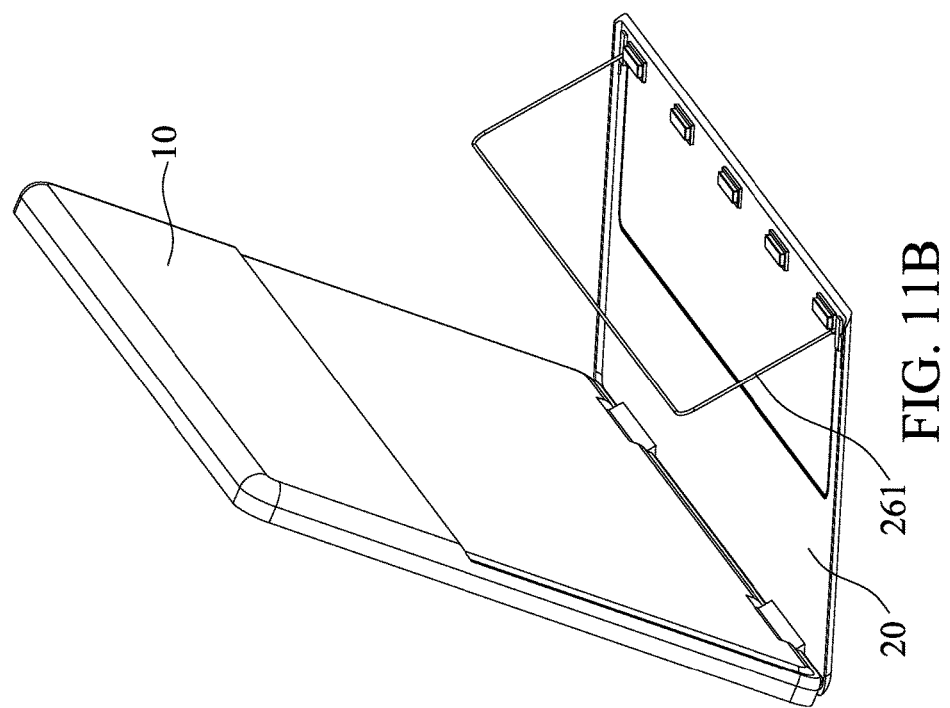

With reference to FIGS. 11A-11B, in a ninth embodiment, the second member 20 further comprises a U-shaped frame 261. When the included angle between the first member 10 and the second member 20 form a second angle (FIG. 11A), the U-shaped frame 261 supports the first member 10.

Figure 12A:
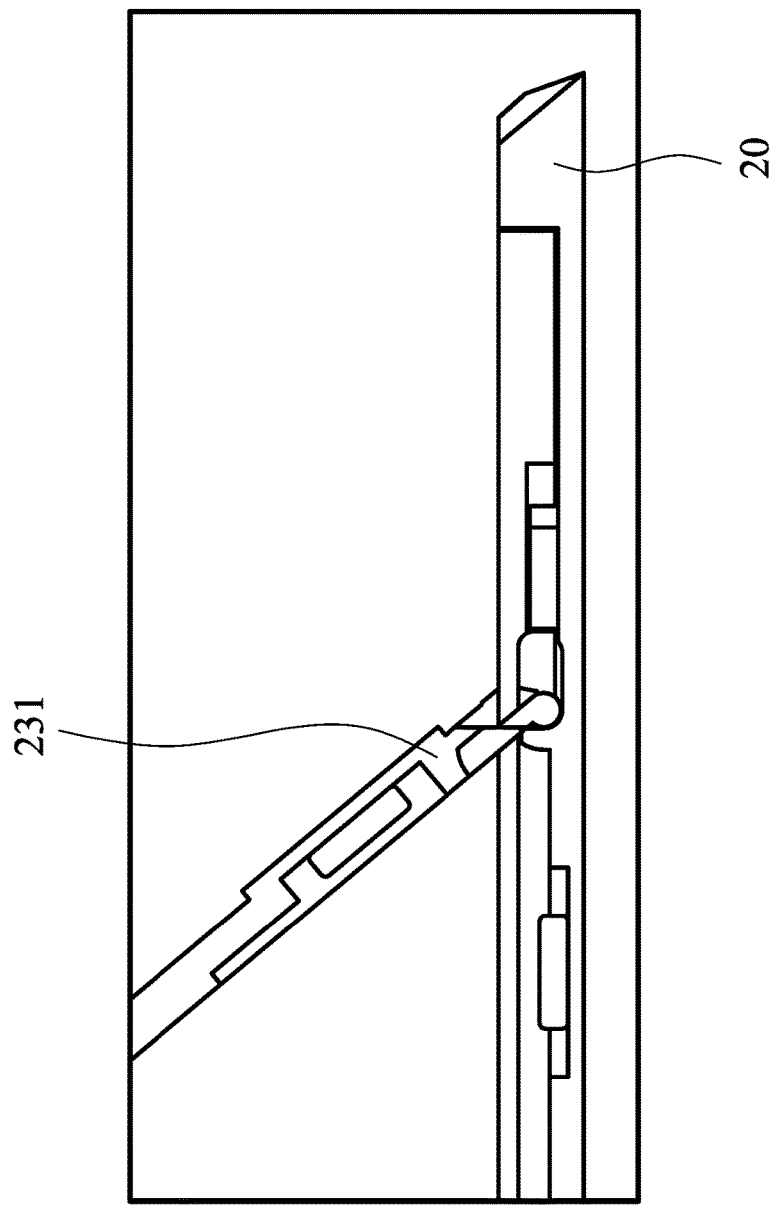
FIGS. 12A, 12B, 12C and 12D show the supporting arm of the eighth embodiment of the invention.
Figure 12B:
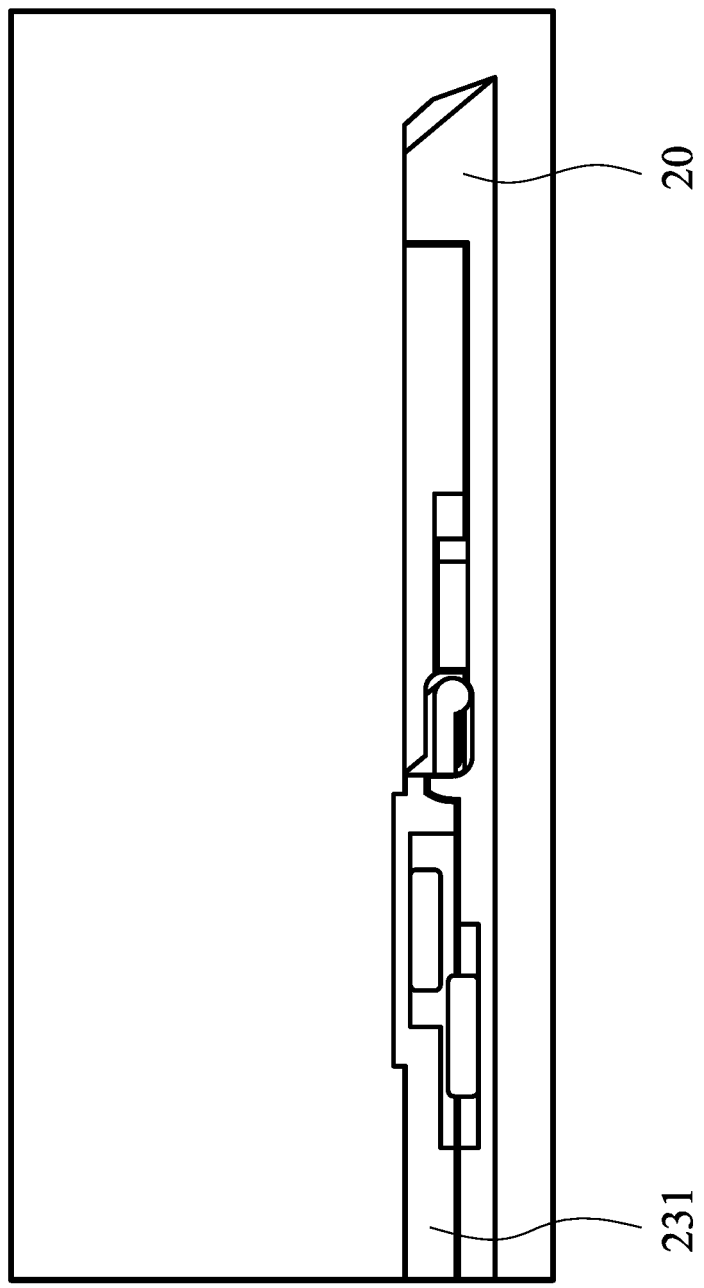
Figure 12C:
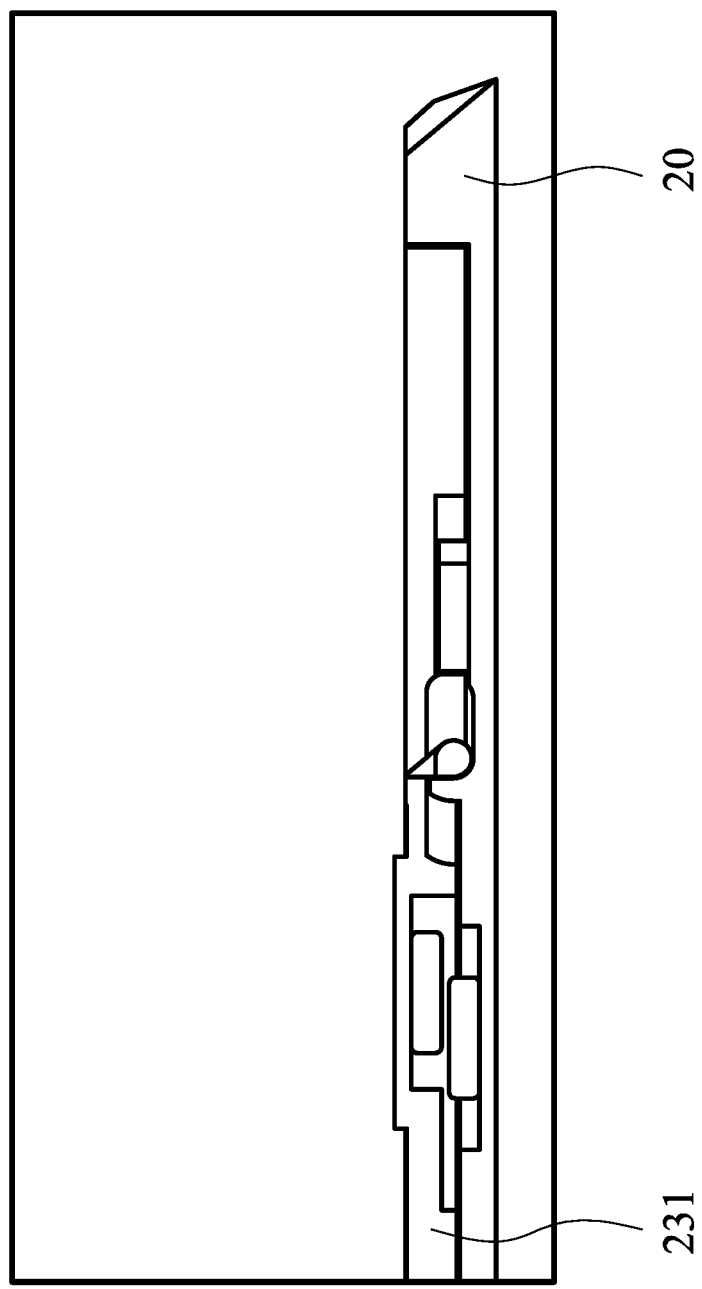
Figure 12D:
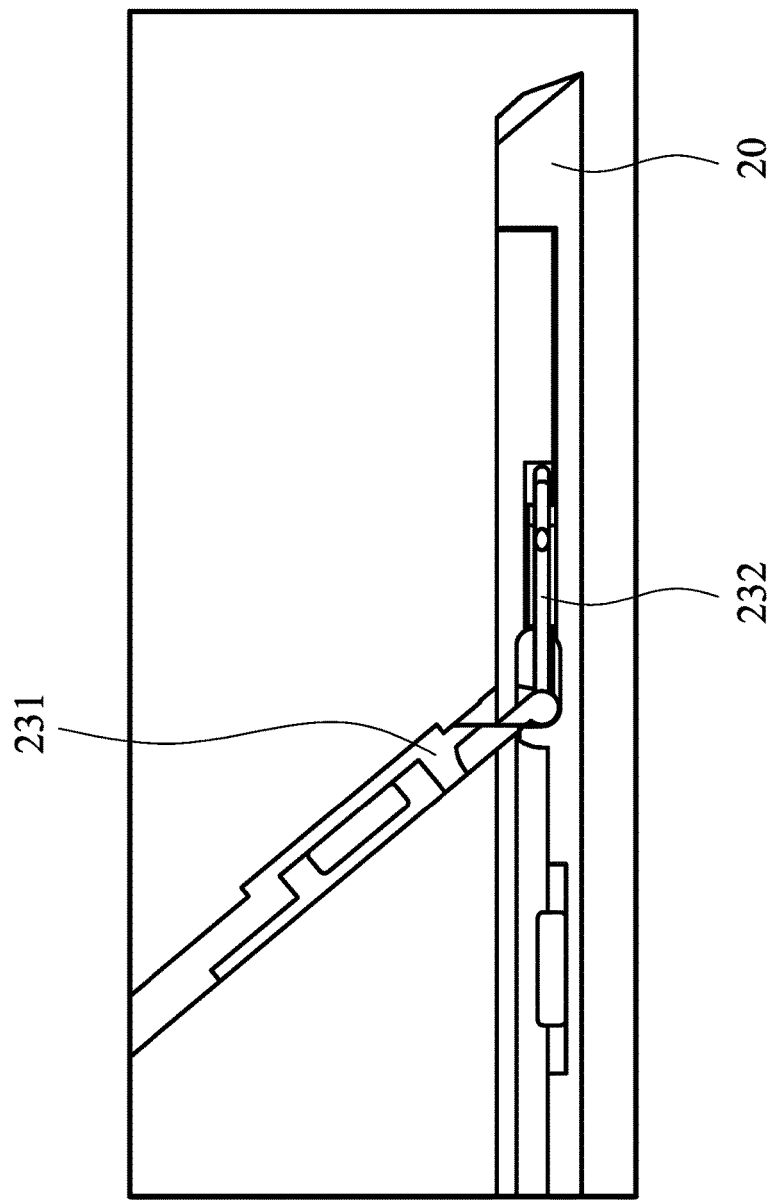

With reference to FIGS. 12A-12D, in a tenth embodiment, the second member 20 comprises a supporting arm 231. With reference to FIG. 12A, in this embodiment, a virtual axis is utilized, and the supporting arm 231 is rotated around the virtual axis. The supporting arm 231 is raised by magnetic repulsion. With reference to FIG. 12B, when an external force is applied to the supporting arm 231, the supporting arm 231 is moved externally and laid down. With reference to FIG. 12C, when the external force disappears, the supporting arm 231 is moved forward and raised. In one embodiment, the spring 232 pushes the supporting arm 231 back into an initial position.

Utilizing the tablet device of the embodiments of the invention, the user needs both hands to separate the second member from the first member only when the included angle between the first member and the second member is zero. Then, the included angle between the first member and the second member can be changed single-handedly by the user. During the included angle modification, the supporting stand sufficiently contacts the table, and supports the tablet.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A tablet device, comprising:
   a first member;
   a second member; and
   a pivot unit, wherein the first member pivots on the second member via the pivot unit, the pivot unit comprises a shaft, a twist sheet, a washer and a twist spring, the twist sheet is telescoped on the shaft, the twist spring is telescoped on the shaft and is connected to the twist sheet, the washer is disposed between the twist sheet and the twist spring, and the shaft is connected to the second member, and the twist sheet is fixed to the first member,
   wherein when an included angle between the first member and the second member is smaller than a first angle, the twist spring pushes the first member and the second member,
   wherein a torque of the twist spring is greater than a sum of a torque of the second member applied to a rotation axis and a torque for opening the pivot unit, wherein a sum of the torque of the first member applied to the rotation axis and the torque for closing the pivot unit is greater than the torque of the twist spring, wherein the sum of the torque of the twist spring and the torque for closing the pivot unit is greater than the torque of the first member applied to the rotation axis, wherein the sum of the torque of the twist spring and the torque for closing the pivot unit subtracting the torque of the first member applied to the rotation axis is greater than a torque of an external force applied to the rotation axis.

2. The tablet device as claimed in claim 1, further comprising a first magnet and a second magnet, the first magnet is disposed on the first member, the second magnet is disposed on the second member, and when the first member overlaps the second member, the first magnet and the second magnet attract each other.

3. The tablet device as claimed in claim 2, wherein the first angle is 80 degrees.

4. The tablet device as claimed in claim 1, wherein the pivot unit further comprises a cam washer, the cam washer is telescoped on the shaft, the cam washer comprises an inclined plane, the shaft comprises a protrusion, and when the included angle between the first member and the second member form a second angle, the protrusion abuts the inclined plane.

5. The tablet device as claimed in claim 1, wherein the first member further comprises a connection portion, the second member comprises a supporting sheet and a sliding slot, an end of the supporting sheet slides in the sliding slot, and when the included angle between the first member and the second member is between the first angle and a second angle, the other end of the supporting sheet abuts the connection portion.

6. The tablet device as claimed in claim 5, wherein the first member is connected to the supporting sheet via magnetic attraction.

7. The tablet device as claimed in claim 1, wherein the first member comprises a groove, the second member comprises a supporting arm, and when the included angle between the first member and the second member form a second angle, the supporting arm abuts the groove.

8. The tablet device as claimed in claim 7, wherein the supporting arm stands on the second member by magnetic repulsion.

9. The tablet device as claimed in claim 1, wherein the first member comprises a supporting arm, the second member comprises a protrusion, and when the included angle between the first member and the second member form a second angle, the supporting arm abuts the protrusion.

10. The tablet device as claimed in claim 9, wherein the supporting arm comprises a roller, the roller is disposed on an end of the supporting arm, and the roller is attached to the second member by magnetic attraction.

11. The tablet device as claimed in claim 10, wherein the supporting arm further comprises a spring, and the spring is disposed on the other end of the supporting arm.

12. The tablet device as claimed in claim 1, wherein the first member comprises a supporting arm, the supporting arm pivots on the first member, the second member comprises a rail, the supporting arm comprises a pillar, and the pillar slides in the rail.

13. The tablet device as claimed in claim 12, wherein the rail comprises an inclined plane, and when the included angle between the first member and the second member form a second angle, the pillar abuts the inclined plane.

14. The tablet device as claimed in claim 1, wherein the second member further comprises a U-shaped frame, and when the included angle between the first member and the second member form a second angle, the U-shaped frame supports the first member.

15. A tablet device, comprising:
 a first member;
 a second member; and
 a pivot unit, wherein the first member pivots on the second member via the pivot unit, the pivot unit comprises a shaft, a twist sheet, a washer and a twist spring, the twist sheet is telescoped on the shaft, the twist spring is telescoped on the shaft and is connected to the twist sheet, the washer is disposed between the twist sheet and the twist spring, and the shaft is connected to the second member, and the twist sheet is fixed to the first member,
wherein when an included angle between the first member and the second member is smaller than a first angle, the twist spring pushes the first member and the second member,
wherein the first member comprises an elastic pusher movably disposed in a recess formed in the first member, and the second member comprises a groove located on a surface of the second member rotatable relative to the elastic pusher, wherein when the included angle between the first member and the second member is smaller than a second angle, the elastic pusher contacts a portion of the second member located out of the groove, and when the included angle between the first member and the second member is between the first angle and the second angle, the elastic pusher is inserted into the groove, and when the included angle between the first member and the second member is changed from being larger than the second angle to being smaller than the second angle, the elastic pusher pushes against an edge of the groove to provide resistance.

* * * * *